INVENTOR
DANIEL W. FOX

BY *Robert L. Goldberg*
HIS ATTORNEY 3,485,607
ABRASIVE ARTICLES COMPRISING A POLY-
PHENYLENE OXIDE BINDER
Daniel W. Fox, Pittsfield, Mass., assignor to General
Electric Company, a corporation of New York
Filed Sept. 2, 1966, Ser. No. 576,908
Int. Cl. C08g 51/12
U.S. Cl. 51—298         11 Claims

ABSTRACT OF THE DISCLOSURE

The invention is directed to an abrasive article comprising a major portion of a granular abrasive such as diamond dust, silicon carbide, boron carbide, aluminum oxide and the like dispersed in a polyphenylene oxide binder. The abrasive article is characterized by an ability to maintain structural integrity at the high speeds and elevated temperatures assocated with grinding operations and is not subject to embrittlement and corresponding fracture even in the absence of plasticizers typically included in abrasive formulations.

---

Figure 1:
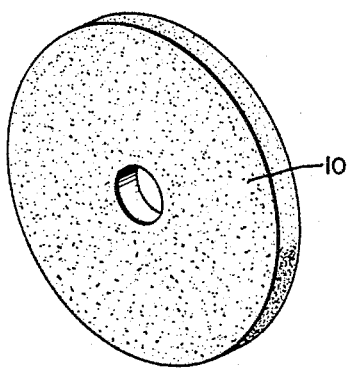

This invention relates to the manufacture of abrasive articles useful as grinding wheels, cutting edges, razor hones, drills, sandpaper, and in general, articles useful for grinding, abrading and cutting operations. More particularly, this invention relates to a flexible, abrasive composition that will not fracture during use and will retain its structural integrity at elevated temperatures. In one of its alternative embodiments, this invention relaes to a lacquer composition containing a granular abrasive that may be coated onto the surface of an existing cutting edge.

In general, in one of its broader aspects, this invention relates to an abrasive composition consisting of a resinous binder having a high heat distortion temperature and a granular abrasive material contained therein.

Abrasive articles consisting of mineral granules bonded by means of a resinous binder are well known in the art. They are normally manufactured by what is known in the art as the "cold press" method. In this method, an abrasive mixture consisting of abrasive granules and a solid, curable pressure unifiable binder in granular form is added to a mold and subjected therein to a high pressure so as to form a unified uncured blank. The blank is then removed from the mold and fired in an oven to cure the binder. Typical resins that have been employed for this purpose include the phenol-aldehyde condensation products, phenol-furfural resins, urea-aldehyde condensation products, melamine-aldehyde condensation resins, thiourea-aldehyde condensation resins, aminotriazine-aldehyde condensation resins, epoxy resins, such as the reaction product of bisphenol-A and epichlorohydrin, etc. It has been found that abrasive tools formed from the resins normally used, such as those represented above, have a tendency to fracture during use. This creates a hazard to the operator and also results in destruction of the abrasive tool. This fracture is caused by embrittlement of the tool's surface due to curing of the resinous binder at the high temperatures developed on the surface of the tool when used at high speeds in contact with hard materials. To overcome the difficulties encountered by the prior art, it has been proposed to add large quantities of plasticizers to the abrasive compositions forming the tool. In general, the addition of plasticizers results in only marginal increases in flexibility. Embrittlement of the tool during use is still a problem. In those cases where substantial flexibility is imparted to the abrasive compositions, the surface of the tool is soft and the binder tends to become gummy and sticky during use due to a large decrease in the heat distortion temperature of the binder.

It has now been unexpectedly found that an abrasive composition consisting of an abrasive dispersed in a polyphenylene oxide binder is highly durable and maintains its structural integrity even at the high speeds and elevated temperatures associated with all grinding operations and in addition, is not subject to embrittlement and corresponding fracture even in the absence of plasticizers. It has also been unexpectedly found that the abrasive composition of the present invention may be used in the form of a lacquer comprising the polyphenylene oxide binder, the abrasive and a solvent for the binder and may be readily coated onto existing abrasive and cutting surfaces to recondition the same. In addition, when the lacquer is applied to the surface of a cutting edge, it has been unexpectedly found that it both reconditions the surface and the surface becomes self-sharpening. Alternatively, the abrasive-filled lacquer may be applied to a substrate having a desired shape to form an abrasive tool wherein the abrasive granules are contained only on the surface of the tool.

Accordingly, one object of this invention is to provide an abrasive article consisting of abrasive granules dispersed in a polyphenylene oxide binder.

Another object of this invention is to provide a lacquer composition consisting of a polyphenylene oxide binder, abrasive granules and a solvent for the binder.

A third object of this invention is to provide an abrasive article that is both strong and flexible at elevated temperatures and not subject to embrittlement and fracture.

Still another object of this invention is to provide a cutting edge having a coating thereon capable of reconditioning the cutting edge and adding a self-sharpening effect thereto.

Other objects and advantages of this invention will be in part apparent and in part pointed out in the description which follows.

The expression "polyphenylene oxide" as used herein is meant to include within its scope those materials corresponding to the following general formula:

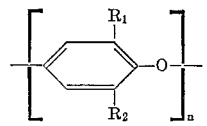

wherein the oxygen ether atom of one repeating unit is attached to the phenylene nucleus of the next repeating unit, $R_1$ and $R_2$ are alkyl, having from 1–3 carbon atoms; and $n$ is a whole integer of at least 100.

There are numerous methods for preparing the polyphenylene oxides. One method involves the oxidative coupling of monovalent phenols. This method is disclosed and claimed in U.S. Patents Nos. 3,306,874 and 3,306,875 of Allan S. Hay, incorporated herein by reference.

The abrasives that may be used in combination with the polyphenylene oxides are well known in the art and in general, any of the abrasives heretofore used for grinding wheels, cutting edges and the like, are satisfactory. Typical examples of suitable abrasives include, but are not limited to, synthetic and natural diamonds, titanium carbide, silicon carbide, tantalum carbide, tungsten carbide, zirconium carbide, chromium carbide, boron carbide, titanium nitride, aluminum oxide, silica, etc.

There are many methods for fabricating abrasive articles containing abrasive granules dispersed in a polyphenylene oxide binder. The simplest method comprises hot molding. A mixture is prepared containing from 50 to 95% by weight, and preferably from 65 to 95% by weight abrasive granules and from 5 to 50% by weight and preferably from 5 to 35% by weight of the resin by any means known to those skilled in the art, such as by tumbling, shaking, etc. The mixture is then placed in a mold having a configuration conforming to the shape of the desired article. The composition is pressed at a pressure of at least 8,000 p.s.i. and heated to a temperature ranging between 300° F. and 750° F. and preferably between 450° F. and 650° F. The composition is maintained at this temperature for a period of time sufficient to form a unitary, coherent structure. Thereafter, the pressure is released and the tool allowed to cool to room temperature.

A grinding wheel made in accordance with the procedure set forth above is depicted in FIGURE 1 of the drawing. It can be seen that the abrasive 10 is homogeneously distributed throughout the polyphenylene oxide binder. For many applications, particularly high performance applications, the cost of an abrasive such as diamond dust is high and it would be desirable to use as little abrasive as possible. In a situation of this nature, the article can be fabricated so as to have a high concentration of the abrasive material on the surface of the article and little or no abrasive in its center. An abrasive tool with a high concentration of abrasive at its surface can be manufactured by hot pressing methods. In this case, a dispersion of the abrasive in a 10 to 40% polyphenylene oxide solution is applied as a lacquer to the walls of the mold which will ultimately become the working surface of the tool. The solvent in the lacquer is evaporated and the center of the mold is filled with the polyphenylene oxide containing little or no abrasive particles. Heat and pressure are then applied to the mold in the same manner as described above. The resultant article will have the abrasive particles only at its surface and yet, will be bonded to the remaining portion of the tool as completely as if the concentration of the abrasive component was the same throughout the entire article.

Figure 2:
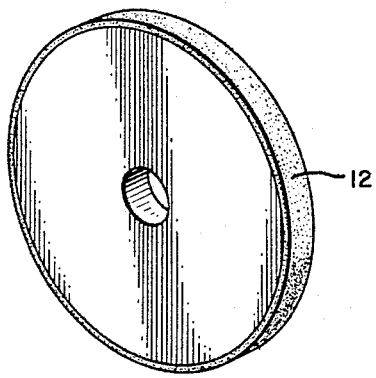

A grinding wheel having a high concentration of abrasive material at its surface and having a core free of abrasive material is depicted in FIGURE 2. It can be seen from the drawing that the core of the article is free of abrasive and a coating 12 of high abrasive concentration is present on the surface.

An alternative procedure for forming an abrasive tool having a high concentration of abrasive on the working surface comprises forming a tool core having the desired configuration and coating the core with a lacquer consisting of abrasive granules, the polyphenylene oxide binder and a solvent for the polyphenylene oxide such as chlorobenzene, acetone, toluene, etc. The lacquer is painted on to the surface of the core using a brush or dip techniques and allowed to dry or baked at elevated temperatures.

An additional method for forming abrasive tools having a flat or cylindrical cross-section comprises extruding a mixture of the abrasive granules and polyphenylene oxide binder prepared in the manner set forth above. Extrusion temperatures may range between 300 and 750° F. This method is particularly useful as a means for continuous production of specially shaped tools which may be cut from appropriate profile extrusions.

The following examples are set forth for purposes of illustration. All percentages expressed in the examples are by weight unless otherwise indicated.

EXAMPLE I

A poly-(2,6-dimethyl-1,4-phenylene)-oxide was mixed with a fine, synthetic diamond dust. A ratio of one part polyphenylene oxide was used to four parts diamond dust. The mixture was placed in a mold conforming to one-half of a scissors. Pressure was applied and the mold was heated to approximately 480° F. and maintained at this temperature for fifteen minutes. It was then allowed to cool. A second mating portion of a scissors was prepared and the two halves joined. The so-formed scissors was strong and could cut fabrics and paper with as smooth a cut as a metallic scissors.

The advantages of scissors formed in the manner described above over metallic scisssors are low cost and freedom from corrosion. The first advantage is a result of relatively inexpensive materials and inexpensive fabricating techniques. Inasmuch as the polyphenylene oxides maintain their structural integrity at elevated temperatures and are not altered by hot water or steam, scissors and surgical instruments in general could be fabricated from this material and not suffer corrosion or deterioration upon exposure to steam sterilization.

EXAMPLE II

A quantity of granular poly-(2,6-dimethyl-1,4-phenylene)-oxide was charged to a mold having the configuration of a cutting blade typically used in connection with paper cutting apparatus. The charge of polyphenylene oxide was heated to approximately 450° F. and maintained at this temperature for approximately fifteen minutes under a pressure of 10,000 p.s.i. Thereafter, the pressure was released, the mold was allowed to cool, and the blade was removed. A lacquer was prepared from one gram of the same polyphenylene oxide, three grams of diamond dust having a particle size varying between four and eight microns, and thirty-six grams of chloroform. The mixture was shaken to dissolve the polyphenylene oxide and then the lacquer was painted on the edge of the molded polyphenylene oxide cutting blade. The so-coated cutting blade was air dried and then gradually heated in an oven to a temperature of approximately 500° F. Heating was continued until a coherent coating of the abrasive composition adhered to the surface of the cutting blade.

The cutting blade was attached to a paper cutting apparatus and it was found that the blade was capable of cutting a plurality of sheets of paper as well as the very touch films of Mylar and Lexan.

EXAMPLE III

A polyphenylene oxide cutting blade (free of abrasive granules) was prepared in the manner described in Example II. The blade was attached to the cutting apparatus. It could not cut either the Mylar nor Lexan films.

EXAMPLE IV

A mixture consisting of one part abrasive silica and one part of a poly-(2,6-dimethyl 1,4-phenylene)-oxide was prepared. This mixture was fed to a mold having a configuration of a paper cutting blade. The mold was heated to approximately 500° F. and maintained at that temperature for a period of twenty minutes. The pressure was released and the mold was allowed to cool. The so-formed cutting blade was removed from the mold and attached to a paper cutting apparatus. It was found that the blade could easily cut eight thicknesses of paper and Mylar film.

EXAMPLE V

The procedure of Example IV was repeated, however silicon carbide was substituted for the silicon oxide. It was found that the so-formed blade could easily cut a plurality of sheets of paper plus both Lexan and Mylar film.

EXAMPLE VI

The cutting blades of Examples IV and V were allowed to stand in boiling water for a period of three days. The purpose of this test was to determine whether the blades could be sterilized without adversely effecting their physical properties. After the three day period, the blades were removed from the boiling water and attached to the paper cutting apparatus. It was found that the blades could cut both Mylar and Lexan film as well as before boiling. Therefore, it was concluded that the exposure to boiling water did not have an adverse effect on the cutting ability of the blades.

EXAMPLE VII

A lacquer was prepared by dissolving twenty grams of a poly-(2,6-dimethyl-1,4-phenylene)-oxide in 200 ml. of methylene chloride. Thereafter, 100 grams of an abrasive aluminum oxide were added to the solution. The lacquer was doctored onto a glass sheet and first air-dried and then dried at 210° F. for two hours. The resulting film was cut into two inch diameter circular samples. A stack was formed consisting of several layers of the abrasive filled film interleaved with several layers of polyphenylene oxide saturated glass fabric for increased strength. The stack was pressed at a temperature of about 440° F. The stack was allowed to cool and then removed from the press. The resulting disk was fastened to a rotating shaft for use as a saw blade. At a speed of 1700 r.p.m. the disk would readily cut glass. Water cooling by means of a directed spray of water at the point of cutting promoted the sawability. A five inch disk was prepared in the same manner and substituted for the two inch disk. A speed of five to six thousand r.p.m. was tried. It was found that the disk could cut glass, ceramic tile, etc.

EXAMPLE VIII

A metallic grinding wheel blank is inserted in a circular mold and the peripheral volume between the blank and the mold is filled with a mixture of 75% synthetic diamond and 25% poly-(2,6-dimethyl-1,4-phenylene)-oxide. The mold is heated to about 480° F. and maintained at this temperature for a period of fifteen minutes. The product is a grinding wheel having a thickness of about three-quarters of an inch and a diameter of approximately five inches. It could be used to grind hard metal surfaces.

It is possible to extrude the polyphenylene oxide binder containing a high loading of abrasive granules, preferably diamond dust, into a relatively thick filament i.e., five millimeters. This results in a filament having abrasive particles embedded in the filament in the direction of extrusion. This filament can then be stretched longitudinally to bring the diamond dust to the surface of the strand. The resultant strand would have a thickness of approximately 1 to 2 millimeters and could be used in relatively short sections as blades for handyman saws such as the new cut-in-any-direction wire files used in coping and jigsaws. Alternatively, short lengths could be wrapped around glass pipe for cutting by a hand sawing action.

EXAMPLE IX

A solution was prepared consisting of a poly-(2,6-dimethyl-1,4-phenylene)-oxide, silica and methylene chloride. A continuous glass fiber roving was passed through the solution and the methylene chloride evaporated. The product was cut into short sections and used as jigsaw blades.

In another application, a lacquer such as those described in the above examples, can be coated onto existing cutting edges such as lawnmower blades, paper cutting edges, scissors, etc. This results in a reconditioning of the cutting edge and also adds a self-sharpening effect when in use. This is possible due to the ability of the polyphenylene oxide binder to adhere tenaciously to most surfaces.

An additional advantage of this invention resides in the solubility of the polyphenylene oxides in many organic solvents. A worn or damaged abrasive tool made in accordance with the present invention may be dissolved in a solvent and the abrasive and binder recovered. The same is true with tools that have defects developed in the molding operation. The prior art abrasive tools are not soluble in organic solvents and must be disposed of when worn or damaged.

It should, of course, be apparent to those skilled in the art that changes may be made in the particular embodiments of the invention described which are within the full intent and scope of the invention as defined by the appended claims.

What I claim as new and desire to secure by Letters Patent of the United States is:

1. An abrasive article not subject to embrittlement and capable of maintaining structural integrity at elevated temperatures comprising from 65 to 95% by weight of abrasive granules and from 5 to 35% by weight of a polymeric binder having the general formula:

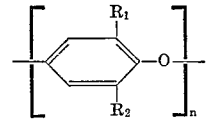

wherein the oxygen ether atom of one repeating unit is connected to the phenylene nucleus of the next repeating unit; $R_1$ and $R_2$ are lower alkyls having from 1–3 carbon atoms and $n$ is a whole integer of at least 100.

2. The abrasive article of claim 1 wherein $R_1$ and $R_2$ are both methyl.

3. The abrasive article of claim 2 in the form of a grinding wheel.

4. The abrasive article of claim 2 in the form of a cutting edge.

5. An abrasive lacquer composition comprising:
   (a) from 5 to 35 parts by weight of a polyphenylene oxide having the formula

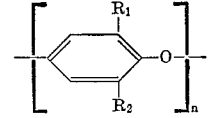

wherein the oxygen ether atom of one repeating unit is connected to the phenylene nucleus of the next repeating unit; $R_1$ and $R_2$ are lower alkyls having from 1–3 carbon atoms and $n$ is a whole integer of at least 100;
   (b) from 65 to 95 parts by weight of abrasive granules, and
   (c) a solvent for the polyphenylene oxide.

6. The abrasive lacquer composition of claim 5 wherein $R_1$ and $R_2$ are methyl groups.

7. A method of reconditioning an abradant surface comprising the steps of:
   (a) coating said surface with a lacquer comprising:
      (1) from 5 to 35 parts by weight of a polyphenylene oxide having the formula:

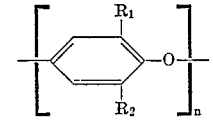

wherein the oxygen ether atom of one repeating unit is connected to the phenylene nucleus of the next repeating unit, $R_1$ and $R_2$ are lower alkyls having from 1–3 carbon atoms and $n$ is a whole integer of at least 100;
      (2) from 65 to 95 parts by weight of abrasive granules, and
      (3) a solvent for the polyphenylene oxide; and
   (b) heating the coated surface to remove the solvent and form a tenacious bond between the coating and the surface.

8. An abradant combination comprising a substrate and a coating of from 65 to 95% by weight of abradant granules dispersed in from 5 to 35% by weight of a polyphenylene oxide binder having the general formula:

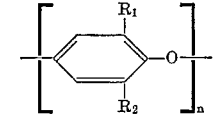

wherein the oxygen ether atom of one repeating unit is connected to the phenylene nucleus of the next repeating unit, $R_1$ and $R_2$ are lower alkyls having 1–3 carbon atoms and $n$ is a whole integer of at least 100.

9. The abradant combination of claim 8 wherein $R_1$ and $R_2$ are both methyl.

10. The abradant combination of claim 9 in the form of a cutting edge.

11. The abradant combination of claim 9 in the form of a grinding wheel.

References Cited

UNITED STATES PATENTS 3,306,874  2/1967  Hay.
3,306,875  2/1967  Hay.

DONALD J. ARNOLD, Primary Examiner

U.S. Cl. X.R.

51—295, 309